(12) United States Patent
Zhou et al.

(10) Patent No.: US 11,816,840 B2
(45) Date of Patent: *Nov. 14, 2023

(54) METHOD, APPARATUS, DEVICE AND STORAGE MEDIUM FOR EXTRACTING A CARDIOVASCULAR VESSEL FROM A CTA IMAGE

(71) Applicant: Shenzhen Institutes of Advanced Technology, Shenzhen (CN)

(72) Inventors: Shoujun Zhou, Shenzhen (CN); Baochang Zhang, Shenzhen (CN); Baolin Li, Shenzhen (CN); Cheng Wang, Shenzhen (CN); Pei Lu, Shenzhen (CN)

(73) Assignee: Shenzhen Institutes of Advanced Technology, Shenzhen (CN)

( * ) Notice: Subject to any disclaimer, the term of this patent is extended or adjusted under 35 U.S.C. 154(b) by 347 days.

This patent is subject to a terminal disclaimer.

(21) Appl. No.: 16/632,579

(22) PCT Filed: Jul. 26, 2017

(86) PCT No.: PCT/CN2017/094476
§ 371 (c)(1),
(2) Date: Jan. 21, 2020

(87) PCT Pub. No.: WO2019/019053
PCT Pub. Date: Jan. 31, 2019

(65) Prior Publication Data
US 2020/0242758 A1 Jul. 30, 2020

(51) Int. Cl.
*G06T 7/11* (2017.01)
*G06T 5/30* (2006.01)
(Continued)

(52) U.S. Cl.
CPC .............. *G06T 7/11* (2017.01); *G06T 5/30* (2013.01); *G06T 7/0012* (2013.01); *G06T 7/262* (2017.01);
(Continued)

(58) Field of Classification Search
CPC .......... G06T 7/002; G06T 7/262; G06T 5/30; G06T 2207/20024; G06T 2207/30101;
(Continued)

(56) References Cited

U.S. PATENT DOCUMENTS 10,769,477 B2 * 9/2020 Zhou ................. G06T 7/0012
2007/0031019 A1 * 2/2007 Lesage ................. G06T 7/155
382/131

OTHER PUBLICATIONS

Yang et al., "Automatic centerline extraction of coronary arteries in coronary computed tomographic angiography", Jun. 2011, Springer, Int. Journal of Cardiovascular Imaging, vol. 28, p. 921-933. (Year: 2011).*

(Continued)

*Primary Examiner* — Vincent Rudolph
*Assistant Examiner* — Timothy Choi
(74) *Attorney, Agent, or Firm* — Dragon Sun Law Firm, PC; Nathaniel Perkins (57) ABSTRACT

A method, an apparatus, a device, and a storage medium for extracting a cardiovascular vessel from a CTA image, the method including the steps of: performing erosion operation and dilation operation on image data successively via a preset structural element to obtain a structure mask; performing a slice-by-slice transformation on the plane of section images of the structural mask to acquire the first ascending aortic structure in the structural mask, and acquiring an aortic center position and an aortic radius in the last slice of the plane of section image of the said structural mask; establishing a binarized sphere structure according to the aortic center position and the aortic radius, and synthe- (Continued)

sizing a second ascending aorta structure by combining the first ascending aorta structure with the structure mask and the binarized sphere structure.

4 Claims, 4 Drawing Sheets

(51) Int. Cl.
　　　G06T 7/00　　　　(2017.01)
　　　G06V 10/34　　　(2022.01)
　　　G06T 7/262　　　(2017.01)
(52) U.S. Cl.
　　　CPC .... *G06V 10/34* (2022.01); *G06T 2207/20024* (2013.01); *G06T 2207/30104* (2013.01); *G06T 2211/404* (2013.01)
(58) Field of Classification Search
　　　CPC .... G06T 2207/30104; G06T 2211/404; G06K 9/46
　　　See application file for complete search history.

(56) References Cited

OTHER PUBLICATIONS

Masutani et al., "VascularShape Segmentation and Structure Extraction Using a Shape-Based Region-Growing Model", Oct. 1998, Springer, Medical Image Computing and Computer-Assisted Intervention—MICCAI'98, p. 1242-1249. (Year: 1998).*

Trentin et al., "An automatic tool for thoracic aorta segmentation and 3D geometric analysis", Sep. 2015, IEEE, 9th Int. Symposium on Image and Signal Processing and Analysis, p. 60-65. (Year: 2015).*

Elattar et al., "Automatic segmentation of the aortic root in CT angiography of candidate patients for transcatheter aortic valve implantation", Jun. 2014, Springer, Medical & Biological Engineering & Computing (2014), vol. 52, p. 6111-618 (Year: 2014).*

Yang et al., "Improved Hessian multiscale enhancement filter", Sep. 2014, IOS Press, Bio-Medical Materials and Engineering, vol. 24, No. 6, p. 3267-3275. (Year: 2014).*

Li et al., "An automatic and efficient coronary arteries extraction method in CT angiographies", May 2017, Elsevier, Biomedical Signal Processing and Control, vol. 36, p. 221-233. (Year: 2017).*

Zhang et al., "An automatic and efficient coronary arteries extraction method in CT angiographies", Oct. 2010, IEEE, 2010 Chinese Conference on Pattern Recognition (CCPR), p. 1-5. (Year: 2010).*

Tayebi et al., "Cardiac Components Categorization and Coronary Artery Enhancement in CT Angiography", Dec. 2014, IEEE, 2014 International Conference on Computer Assisted System in Health, p. 18-21. (Year: 2014).*

Zhou et al., "Automated coronary artery tree extraction in coronary CT angiography using a multiscale enhancement and dynamic balloon tracking (MSCAR-DBT) method", Jan. 2012, Elsevier, Computerized Medical Imaging and Graphics, vol. 36, p. 1-10. (Year: 2012).*

* cited by examiner

METHOD, APPARATUS, DEVICE AND STORAGE MEDIUM FOR EXTRACTING A CARDIOVASCULAR VESSEL FROM A CTA IMAGE

REFERENCE TO RELATED APPLICATIONS

This application claims the benefits of the filing dates of Chinese patent application Serial No. 201710618659.7 filed on Jul. 26, 2017 and PCT Patent Application Serial No. PCT/CN2017/094476 filed on Jul. 26, 2017, entitled "Method for extracting blood vessels in CTA image, device, equipment and storage medium". The teachings of the entire referenced applications are incorporated herein by reference.

FIELD OF THE INVENTION

The invention relates to the technical field of medical image processing, particularly a method, an apparatus, a device, and a storage medium for extracting a cardiovascular vessel from a CTA image.

BACKGROUND OF THE INVENTION

As an image preprocessing method, cardiovascular vessel extraction is of great significance for the visualization of clinical diagnosis, interventional surgery planning and interventional therapy processes. It extracts an ascending section of heart aorta from a 3D medical angiography image and enhances the coronary artery vessel. Computed Tomography (CT) Angiography (CTA) coronary images on a heart show complicated tissue structure and background noise, the contrast of blood vessels in the heart is very small, and the contrast of the external pulmonary artery is extremely high, thus the difficulty for extracting the aorta and coronary artery vessel form a CTA image is increased, which is specifically manifested in the following aspects: CTA coronary imaging of the heart is often accompanied by pulmonary vascular structures, so that the diagnosis effect may be affected; how to suppress the brightness of the pulmonary blood vessels and enhance the cardiovascular brightness is a big challenge. When traditional multi-scale filtering is used to enhance cardiovascular vessel, the ascending aorta and coronary artery vessel are extracted according to the spatial morphological information of the target and combined with traditional multi-scale filtering enhancement. The axial projection after multi-scale filtering processing produces a higher response in the lung region with high contrast between blood vessel and the background, but has a small or no response in the heart region with low contrast between blood vessel and the background, because the heart aorta, the cardiovascular vessel and the heart chambers show the same contrast agent concentration in the environment of contrast agent injection, which makes the signal-to-noise ratio in each structural region very low, so no good result can be obtained via the traditional coronary enhancement method.

SUMMARY OF THE INVENTION

The purpose of the present invention is to provide a method, an apparatus, a device, and a storage medium for extracting a cardiovascular vessel from a CTA image, so as to solve the problem in the prior art that there is no effective method for extracting a cardiovascular vessel from a CTA image, which results in the presence of the pulmonary vascular structures.

For one thing, the present invention provides a method for extracting a cardiovascular vessel from a CTA image, comprising the following steps:

performing erosion operation and dilation operation on image data successively via a preset structural element to obtain a structure mask, said image data is a coronary angiography image after down-sampling processing, and said structural mask is a structure excluding lung region;

performing a slice-by-slice transformation on the plane of section images of the structural mask to acquire the first ascending aortic structure in the structural mask, and acquiring an aortic center position and an aortic radius in the last slice of the plane of section image of the said structural mask;

establishing a binarized sphere structure according to the aortic center position and the aortic radius, and synthesizing a second ascending aorta structure by combining the first ascending aorta structure with the structure mask and the binarized sphere structure.

For another, the present invention provides an apparatus for extracting a cardiovascular vessel from a CTA image, comprising:

a structure mask acquiring unit, configured for performing erosion operation and dilation operation on image data successively via a preset structural element to obtain a structure mask, the image data is a coronary angiography image after down-sampling processing, and the structural mask is a structure excluding lung region;

a slice-by-slice transformation unit, configured for performing a slice-by-slice transformation on plane of section images of the structural mask to acquire the first ascending aortic structure in the structural mask, and acquiring an aortic center position and an aortic radius in the last slice of the plane of section image of the structural mask; and a synthesizing unit, configured for establishing a binarized sphere structure according to the aortic center position and the aortic radius, and synthesizing a second ascending aorta structure by combining the first ascending aorta structure with the structure mask and the binarized sphere structure.

Third, the present invention provides a device for extracting a cardiovascular vessel from a CTA image, comprising a memory, a processor, and a computer program stored in the memory and executable on the processor, and the steps of the method for extracting a cardiovascular vessel from a CTA image are implemented when the computer program is executed by the processor.

Fourth, the present invention also provides a computer-readable storage medium storing a computer program, and the steps of the method for extracting a cardiovascular vessel from a CTA image are implemented when the computer program is executed by the processor.

The present invention performs erosion operation and dilation operation on the image data to erode the irrelevant structures of the lungs and retain the heart and aortic structures, acquires the first ascending aortic structure via the slice-by-slice transformation, and synthesizes a second ascending aortic structure by combining with a binarized sphere structure and performs erosion via a morphological opening operation, so as to obtain the supplementary area of the ascending aorta root, thereby extracting the shapes of ascending aorta and aortic sinus to accurately visualize the aortic structure and morphology, thus providing an important reference for automatic centerline extraction, segmentation and computer-assisted intelligent intervention, thereby greatly improving the level and ability of medical imaging researches to solve clinical issues.

DETAILED DESCRIPTION OF THE PREFERRED EMBODIMENT

In order to make the objects, technical solutions and advantages of the present invention clearer, the present invention will be further illustrated in detail below in conjunction with the drawings and embodiments. It should be understood that the specific embodiments described herein are only used to explain the present invention and are not intended to limit the present invention.

The specific implementation of the present invention will be described in detail below in conjunction with the specific embodiments:

Embodiment 1

Figure 1:
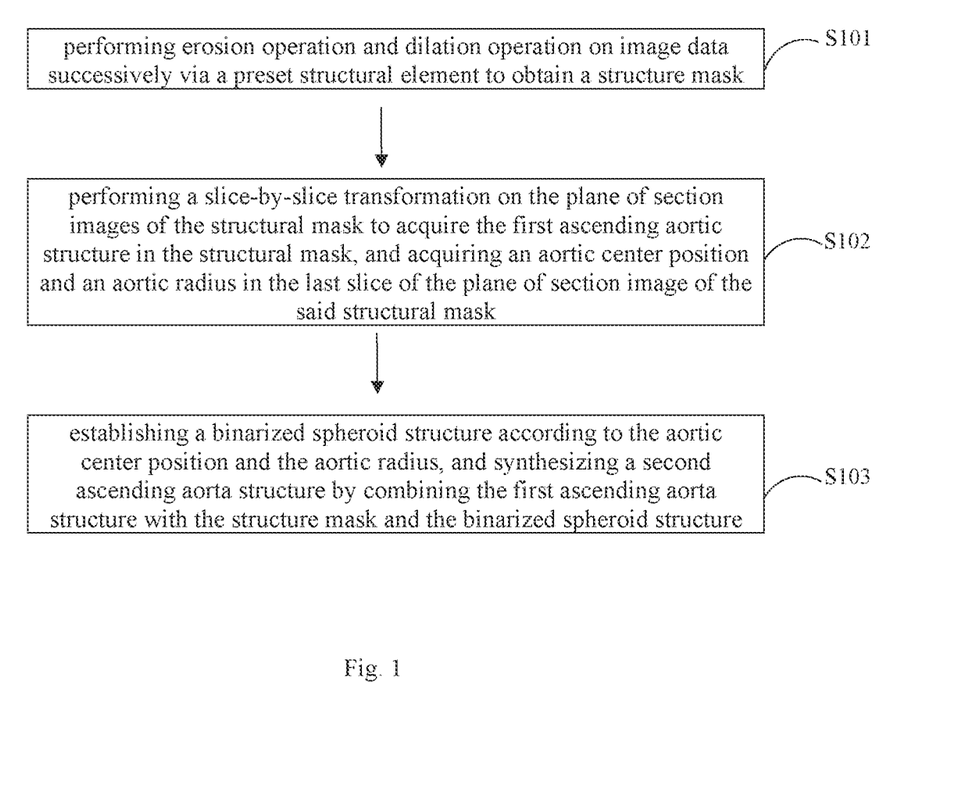
FIG. 1 is an implementation flowchart of a method for extracting a cardiovascular vessel from a CTA image provided in Embodiment 1 of the present invention.

FIG. 1 shows an implementation process of a method for extracting a cardiovascular vessel from a CTA image provided in Embodiment 1 of the present invention, for the convenience of illustration, only the parts related to the embodiment of the present invention are shown, and the details are as follows:

In step S101, erosion operation and dilation operation are performed on image data successively via a preset structural element to obtain a structure mask.

In an embodiment of the present invention, the above image data is a coronary angiography image after down-sampling processing targeted at large-size original CTA data, in order to quickly extract a large-size ascending aortic structure without affecting the precision of the structure extraction. The image size may be down-sampled to half of the original size; some noise in the above image data and some structures that are not related to the aorta are suppressed or attenuated. Erosion operation is performed on image data firstly, then dilation operation is performed to obtain the structure mask B, and the above structural mask is a structure excluding the lung region.

Further, a sphere of which the radius is controlled at a preset volume element is taken as the preset structural element, erosion operation is performed firstly on the image data via a preset structural element, and then dilation operation is performed on image data via a preset structural element to obtain a structure mask which includes: an ascending aorta, partial ventricle and atrium and a descending aorta, of which the partial ventricle and atrium and the descending aorta coexist in a spatial communication area, and the descending aorta is not spatially connected with the ascending aorta and partial ventricle and atrium.

Specifically, a sphere of which the radius is controlled at a preset volume element is selected, and the number of the above preset volume elements is 6±2, the sphere of which the radius is controlled at the preset volume element is used as a preset structural element $K_r$, erosion operation is performed on the image data I firstly via the preset structural element Kr, and then dilation operation I is performed via the preset structural element Kr to obtain the structure mask I', and the above calculation formula is expressed as: $I' = I \circ K_r = (\ominus K_r) \oplus K_r$.

In step S102, a slice-by-slice transformation is performed on plane of section images of the structural mask to acquire the first ascending aortic structure in the structural mask, and an aortic center position and an aortic radius are acquired in the last slice of the plane of section image of the structural mask.

In the embodiment of the present invention, a Hough Transform is performed on the plane of section image of the structural mask, that is, on an axial position plane of the structural mask (i.e., a heart horizontal plane of section), a circular area corresponding to the aorta is selected in each plane of section image, and then, in the circular area segmentation and morphological opening operation are performed to obtain the first ascending aortic structure $A_N$, and an aortic center position $C_{oN}$ and an aortic radius $R_{oN}$ are acquired in the last slice of the plane of section image of the structural mask.

Further, during the slice-by-slice transformation, the current plane of section image will be determined as the last slice of plane of section image if the distance between the aorta center positions of the current plane of section image and the preceding plane of section image is greater than a preset deviation value, and the aorta center position and the aortic radius in the last slice of plane of section image will be acquired.

Specifically, during the slice-by-slice transformation, the aortic center positions (n) and the aortic radius (n), n=1, 2, ..., N, of the current plane of section image are transformed slice by slice. A preset deviation value is set, and the preset deviation value is $\varepsilon = 6 \pm 2$. When the distance between the aorta center positions of two adjacent slices $D_n > \varepsilon$, the detection would be stopped, and the current plane of section image is determined as the last slice of plane of section image, and the aorta center position C(n) and the aortic radius Ro(n) in the last slice of plane of section image are acquired.

In step S103, a binarized sphere structure is established according to the aortic center position and the aortic radius, and a second ascending aortic structure is synthesized by combining the first ascending aortic structure with the structural mask and the binarized sphere structure.

In the embodiment of the present invention, at the aortic center position $C_{oN}$, a binarized sphere structure $Sph_X$ is established by taking the aortic radius $R_{oN}$ as the radius, and a second ascending aortic structure $A_S$ is synthesized by combining the first ascending aortic structure $A_N$ with the structural mask B and the binarized sphere structure $Sph_X$, and the calculation formula is:

$$A_S = (A_N \cup Sph_X) \cap B$$

Where $A_S$ is the second ascending aortic structure, $A_N$ is the first ascending aortic structure, $Sph_X$ is the binarized sphere structure and B is the structural mask, and erosion is performed via a morphological opening operation, so as to obtain the supplementary area of the ascending aorta root, i.e., an aortic sinus area, and the second ascending aortic structure $A_S$ is the complete ascending aortic structure of the aortic sinus.

In the embodiment of the present invention, erosion operation and dilation operation are performed on image data to erode the irrelevant structures of the lungs and retain the heart and aortic structures, the first ascending aortic structure is acquired via the slice-by-slice transformation and combined with a binarized sphere structure to synthesize a second ascending aortic structure, and erosion is performed via a morphological opening operation, so that the supplementary area of the ascending aorta root is obtained, thereby extracting the shapes of ascending aorta and root aortic sinus to accurately visualize the aortic structure and morphology, thus providing an important reference for automatic centerline extraction, segmentation and computer-assisted intelligent intervention to greatly improve the level and ability of medical imaging researches to solve clinical issues.

Embodiment 2

Figure 2:
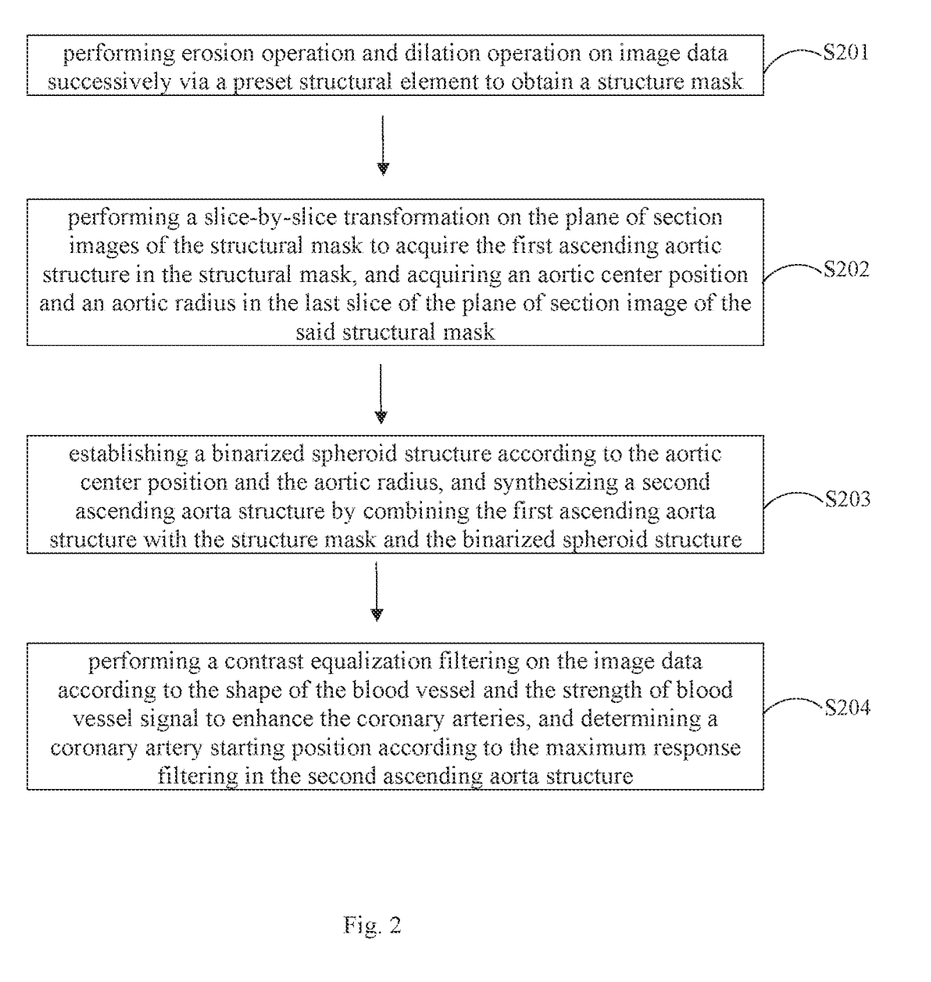
FIG. 2 is an implementation flowchart of a method for extracting a cardiovascular vessel from a CTA image provided in Embodiment 2 of the present invention.

FIG. 2 shows an implementation process of a method for extracting a cardiovascular vessel from a CTA image provided in Embodiment 2 of the present invention, for the convenience of illustration, only the parts related to the embodiment of the present invention are shown, and the details are as follows:

In step S201, erosion operation and dilation operation are performed on image data successively via a preset structural element to obtain a structure mask.

In step S202, a slice-by-slice transformation is performed on plane of section images of the structural mask to acquire the first ascending aortic structure in the structural mask, and an aortic center position and an aortic radius are acquired in the last slice of the plane of section image of the structural mask.

In step S203, a binarized sphere structure is established according to the aortic center position and the aortic radius, and a second ascending aortic structure is synthesized by combining the first ascending aortic structure with the structural mask and the binarized sphere structure.

In step S204, a contrast equalization filtering is performed on the image data according to the shape of the blood vessel and the strength of the blood vessel signal to enhance the coronary arteries, and a coronary artery starting position is determined according to the maximum response filtering in the second ascending aorta structure.

In the embodiment of the present invention, in order to enhance the blood vessels of the heart, prevent the contrast of blood vessels in the heart region from being very low and prevent the blood vessel information from being suppressed, a contrast equalization filtering is performed on the image data according to the shape of the blood vessel and the strength of the blood vessel signal to enhance the coronary arteries. $F_A$ and $F_B$ are blood vessel shape measures, and $F_C$ is a blood vessel signal strength measure, which can be used to improve the signal-to-noise ratio of blood vessels in the heart region, wherein:

$$F_A = e^{-\frac{(1-R_A)^2}{2\alpha^2}}, F_B = e^{-\frac{R_B^2}{2\beta^2}}, F_C = \begin{cases} \gamma_c \cdot e^{-\frac{(Z_\sigma - R_C)^2}{2C^2}} & Z_\sigma \leq c \\ \gamma_c + (1-\gamma_c) \cdot \frac{Z_\sigma - R_C}{(1-r_h) \cdot c} & Z_\sigma > c \end{cases}$$

wherein, $R_A$ and $R_B$ are two measurement functions based on the characteristic values of the Hessian Matrix, $R_A$ is used to distinguish between a sheet structure and a linear structure, $R_B$ is used to distinguish between a point structure and a linear structure, α, β and c function as thresholds for controlling the sensitivity of $R_A$, $R_B$ and $R_c$, and $\gamma_c \in (0,1)$ is a response expectation constant which generally ranges from 0.5 to 0.8. Under a certain scale σ, the spatial Hessian matrix norm $\|H_\sigma\| = \sqrt{\Sigma_{j \leq D} \lambda_j^2}$ exhibits a higher response in the lung region with a larger blood vessel contrast, but exhibits a smaller response in the heart region. $\|H_\sigma\|$ mean value and maximum value in the lung region and the peripheral region both trend to monotonously increase. Therefore, let $Z_\sigma 0$ be a zero matrix, and the maximum norm value under each scale is recorded as:

$$Z_\sigma n(x) \triangleq \max_x\{(Z_\sigma n-1(x), \|H_\sigma n(x)\|)\}, n=1, \ldots, N$$

Then a dynamic threshold c is found, and it may distinguish between the lung region and other tissues according to $Z_\sigma \leq c$ and $Z_\sigma > c$ in measurement $F_C$. The non-lung region is defined as $\theta_h$, the maximum norm is calculated in $\theta_h$ and the full space Θ respectively via $r_h = \|H_{\sigma_n}(x)\|_{max}/\|H_{\sigma_n}(\Theta)\|_{max}$, $r_h \in (0.65, 1)$ is calculated by experimental statistics, and then the parameter $c = r_h \cdot \max(Z\sigma)$ is obtained. Let $R_C = c$, and a blood vessel characteristic graph V(x, σ) after contrast enhancement is finally obtained, $$\mathcal{V}(x,\sigma) \triangleq \begin{cases} 0 & \text{if } \lambda_2 > 0 \text{ or } \lambda_3 > 0 \\ F_A \cdot F_B \cdot F_C & \text{else} \end{cases},$$

where $\lambda_2$ and $\lambda_3$ are the second characteristic value and the third characteristic value of the spatial Hessian matrix respectively.

Figure 3:
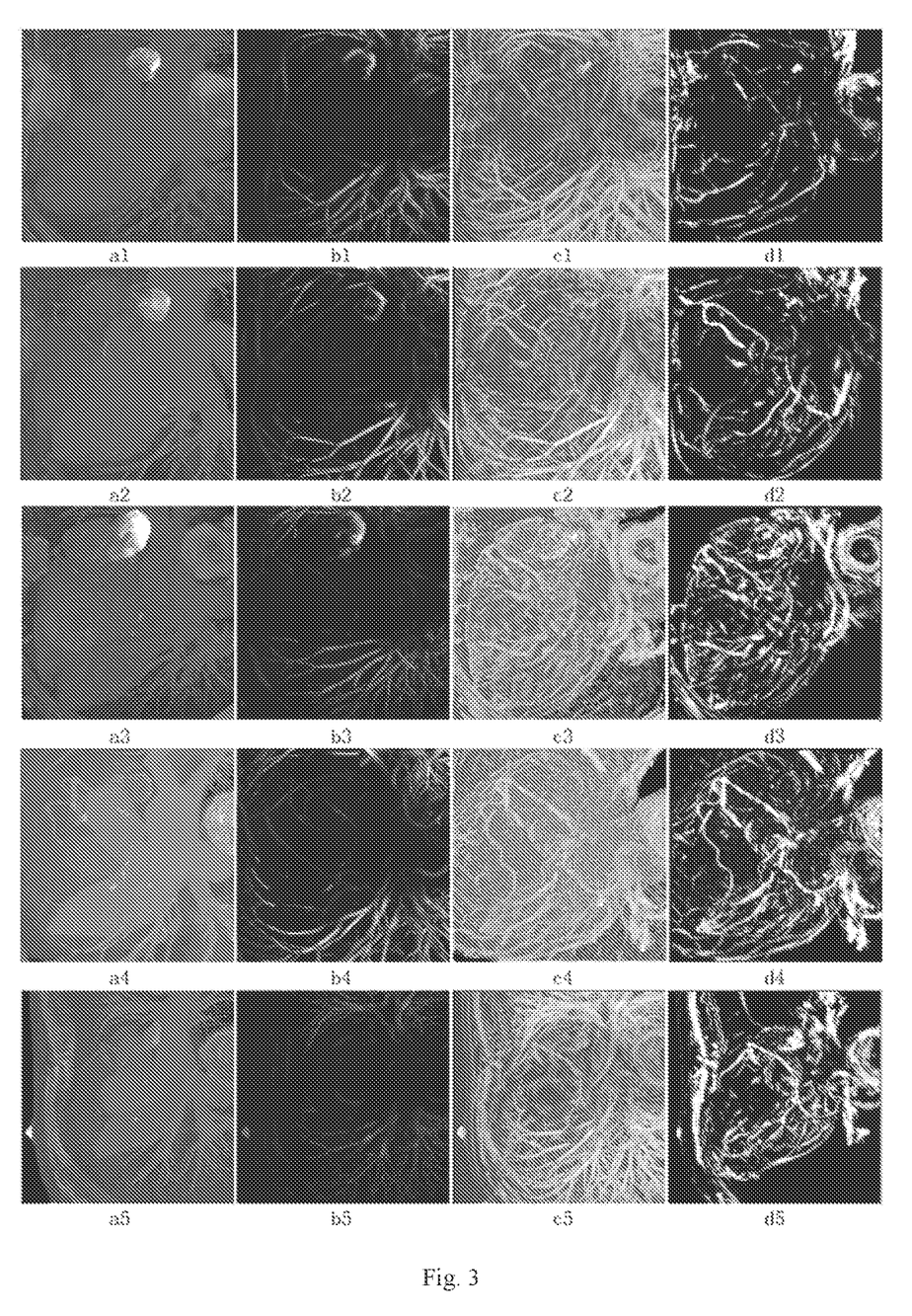
FIG. 3 is a comparison diagram of axial projection effects.

As shown in FIG. 3, a1-a5 are the axial projection effects of the CTA data, b1-b5 are the axial projection effects after multi-scale filtering, c1-c5 are the axial projection effects after contrast equalization filtering, and d1-d5 are the axial projection effects in the non-lung region $\theta_h$ in the present invention. It can be seen from the contrast among d1-d5, b1-b5 and c1-c5 that: b1-b5 clearly show that traditional multi-scale filtering can only enhance the lung blood vessels but cannot enhance the cardiovascular vessels in the heart region, c1-c5 clearly show that the blood vessels in the heart region are significantly enhanced, and d1-d5 clearly show that the blood vessels in the lung region are largely shielded.

Embodiment 3

Figure 4:
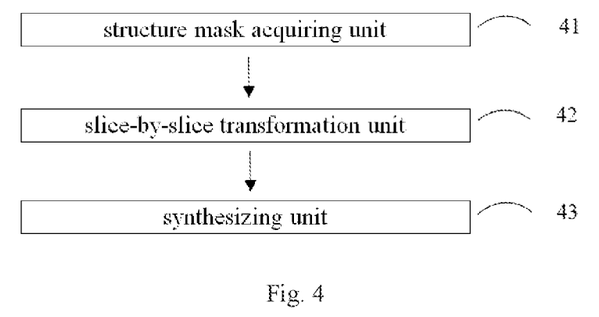
FIG. 4 is a structural representation of an apparatus for extracting a cardiovascular vessel from a CTA image provided in Embodiment 3 of the present invention.

FIG. 4 shows a structural representation of an apparatus for extracting a cardiovascular vessel from a CTA image provided in Embodiment 3 of the present invention, for the convenience of illustration, only the parts related to the embodiment of the present invention are shown, and the apparatus for extracting a cardiovascular vessel from a CTA image comprises:

A structure mask acquiring unit 41, configured for performing erosion operation and dilation operation on image data successively via a preset structural element to obtain a structure mask. The image data is a coronary angiography image after down-sampling processing, and the structural mask is a structure excluding the lung region.

In an embodiment of the present invention, the above image data is a coronary angiography image after down-sampling processing targeted at large-size original CTA data, in order to quickly extract a large-size ascending aortic structure without affecting the precision of the structure extraction. The image size may be down-sampled to half of the original size; some noise in the above image data and some structures that are not related to the aorta are suppressed or attenuated. Erosion operation is performed on image data firstly, then dilation operation is performed to obtain the structure mask B, and the above structural mask is a structure excluding the lung region.

Further, a structure mask acquiring unit comprises:

a structure mask acquiring subunit used to take a sphere of which the radius is controlled at a preset volume element as the preset structural element. Erosion operation is performed firstly on the image data via a preset structural element, and then dilation operation is performed on image data via a preset structural element to obtain a structure mask which includes: an ascending aorta, partial ventricle and atrium and a descending aorta, of which the partial ventricle and atrium and the descending aorta coexist in a spatial communication area, and the descending aorta is not spatially connected with the ascending aorta and partial ventricle and atrium.

Specifically, a sphere of which the radius is controlled at a preset volume element is selected, and the number of the above preset volume elements is 6±2, the sphere of which the radius is controlled at the preset volume element is used as a preset structural element $K_r$, erosion operation is performed on the image data I firstly via the preset structural element Kr, and then dilation operation I is performed via the preset structural element Kr to obtain the structure mask I', and the above calculation formula is expressed as: I'=∘$K_r$=(⊖$K_r$)⊕$K_r$.

A slice-by-slice transformation subunit 42, used to perform a slice-by-slice transformation on plane of section images of the structural mask to acquire the first ascending aortic structure in the structural mask, and an aortic center position and an aortic radius are acquired in the last slice of the plane of section image of the structural mask.

In the embodiment of the present invention, a Hough Transform is performed on the plane of section image of the structural mask, that is, on an axial position plane of the structural mask (i.e., a heart horizontal plane of section), a circular area corresponding to the aorta is selected in each plane of section image, and then, in the circular area segmentation and morphological opening operation are performed to obtain the first ascending aortic structure $A_N$, and an aortic center position $C_{oN}$ and an aortic radius $R_{oN}$ are acquired in the last slice of the plane of section image of the structural mask.

Further, a slice-by-slice transformation comprises:

a slice-by-slice transformation subunit, used in slice-by-slice transformation, where the current plane of section image will be determined as the last slice of plane of section image if the distance between the aorta center positions of the current plane of section image and the preceding plane of section image is greater than a preset deviation value, and the aorta center position and the aortic radius in the last slice of plane of section image will be acquired.

Specifically, during the slice-by-slice transformation, the aortic center positions (n) and the aortic radius (n), n=1, 2, . . . , N, of the current plane of section image are transformed slice by slice. A preset deviation value is set, and the preset deviation value is ε=6±2. When the distance between the aorta center positions of two adjacent slices Dn>ε, the detection would be stopped, and the current plane of section image is determined as the last slice of plane of section image, and the aorta center position C(n) and the aortic radius Ro(n) in the last slice of plane of section image are acquired.

A synthesizing unit 43, configured for establishing a binarized sphere structure according to the aortic center position and the aortic radius, and a second ascending aortic structure is synthesized by combining the first ascending aortic structure with the structural mask and the binarized sphere structure.

In the embodiment of the present invention, at the aortic center position $C_{oN}$, a binarized sphere structure $Sph_X$ is established by taking the aortic radius $R_{oN}$ as the radius, and a second ascending aortic structure $A_S$ is synthesized by combining the first ascending aortic structure $A_N$ with the structural mask B and the binarized sphere structure $Sph_X$, and the calculation formula is:

$$A_S=(A_N \cup Sph_X) \cap B$$

Where $A_S$ is the second ascending aortic structure, $A_N$ is the first ascending aortic structure, $Sph_X$ is the binarized sphere structure and B is the structural mask, and erosion is performed via a morphological opening operation, so as to obtain the supplementary area of the ascending aorta root, i.e., an aortic sinus area, and the second ascending aortic structure $A_S$ is the complete ascending aortic structure of the aortic sinus.

In the embodiment of the present invention, erosion operation and dilation operation are performed on image data to erode the irrelevant structures of the lungs and retain the heart and aortic structures, the first ascending aortic structure is acquired via the slice-by-slice transformation and combined with a binarized sphere structure to synthesize a second ascending aortic structure, and erosion is performed via a morphological opening operation, so that the supplementary area of the ascending aorta root is obtained, thereby extracting the shapes of ascending aorta and root aortic sinus to accurately visualize the aortic structure and morphology, thus providing an important reference for automatic centerline extraction, segmentation and computer-assisted intelligent intervention to greatly improve the level and ability of medical imaging researches to solve clinical issues.

In the embodiment of the present invention, each unit of the apparatus for extracting a cardiovascular vessel from a CTA image may be implemented by corresponding hardware or software unit; each unit may be an independent software or hardware unit, or may be integrated into one software and hardware unit, and it is not intended to limit the invention here.

Embodiment 4

Figure 5:
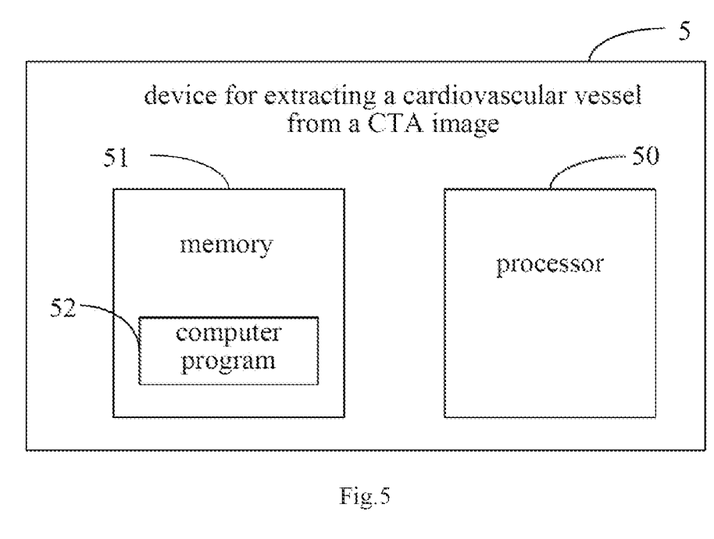
FIG. 5 is a structural representation of a device for extracting a cardiovascular vessel from a CTA image provided in Embodiment 4 of the present invention.

FIG. 5 shows a structural representation of a device for extracting a cardiovascular vessel from a CTA image provided in Embodiment 4 of the present invention, for the convenience of illustration, only the parts related to the embodiment of the present invention are shown The device 5 for extracting a cardiovascular vessel from a CTA image according to the embodiment of the present invention comprises a processor 50, a memory 51 and a computer program 52 stored in memory 51 and executable on processor 50. The steps of the method in the above embodiments for extracting a cardiovascular vessel from a CTA image, such as the steps S101 to S103 shown in FIG. 1, are implemented when the computer program 52 is executed by the processor 50. Alternatively, the function of each module/unit in the above apparatus embodiments, such as the functions of modules 41 to 43 shown in FIG. 4, are implemented when the computer program 52 is executed by the processor 50.

In the embodiment of the present invention, erosion operation and dilation operation are performed on image data to erode the irrelevant structures of the lungs and retain the heart and aortic structures, the first ascending aortic structure is acquired via the slice-by-slice transformation and combined with a binarized sphere structure to synthesize a second ascending aortic structure, and erosion is performed via a morphological opening operation, so that the supplementary area of the ascending aorta root is obtained, thereby extracting the shapes of ascending aorta and root aortic sinus to accurately visualize the aortic structure and morphology, thus providing an important reference for automatic centerline extraction, segmentation and computer-assisted intelligent intervention to greatly improve the level and ability of medical imaging researches to solve clinical issues.

Embodiment 5

In the embodiment of the present invention, a computer-readable storage medium storing a computer program is provided, and the steps of the above methods for extracting a cardiovascular vessel from a CTA image, such as the steps S101 to S103 shown in FIG. 1, are implemented when the computer program is executed by the processor. Alternatively, the function of each module/unit in the above apparatus embodiments, such as the functions of modules 41 to 43 shown in FIG. 4, are implemented when the computer program is executed by the processor.

Erosion operation and dilation operation are performed on image data to erode the irrelevant structures of the lungs and retain the heart and aortic structures, the first ascending aortic structure is acquired via the slice-by-slice transformation and combined with a binarized sphere structure to synthesize a second ascending aortic structure, and erosion is performed via a morphological opening operation, so that the supplementary area of the ascending aorta root is obtained, thereby extracting the shapes of ascending aorta and root aortic sinus to accurately visualize the aortic structure and morphology, thus providing an important reference for automatic centerline extraction, segmentation and computer-assisted intelligent intervention to greatly improve the level and ability of medical imaging researches to solve clinical issues.

The computer-readable storage medium according to the embodiment of the present invention may include any entity or device and recording medium capable of carrying a computer program code, for example, a memory such as ROM/RAM, magnetic disk, optical disk, and flash memory.

The above description is only the preferred embodiments of the present invention and is not intended to limit the present invention. Any modification, equivalent replacement and improvement within the spirit and principle of the present invention shall be included in the protection scope of the present invention.

The invention claimed is:

1. A method for extracting a cardiovascular vessel from a CTA image, comprising the steps of:

performing a first erosion operation and dilation operation on an image data I successively via a preset structural element Kr to obtain a structure mask I', said image data I is a coronary angiography image after down-sampling processing targeted at large-size original CTA data; in order to quickly extract a large-size ascending aortic structure without affecting the precision of the structure extraction; and said structural mask I' is a structure excluding lung region, wherein a sphere of which the radius is controlled at a preset volume element is selected, and the number of the above preset volume elements is 6±2, the sphere of which the radius is controlled at the preset volume element is used as a preset structural element Kr, the erosion operation is performed on the image data I firstly via the preset structural element Kr, and then the dilation operation is performed via the preset structural element Kr to obtain the structure mask I' with a calculation formula expressed as: I'=I∘K$_r$=(I⊖K$_r$)⊕K$_r$;

performing a slice-by-slice transformation on the plane of section images of the structural mask I' to acquire the first ascending aortic structure in the structural mask, and acquiring an aortic center position and an aortic radius in the last slice of the plane of section image of said structural mask I', wherein, during the slice-by-slice transformation, the aortic center positions Co(n) and the aortic radius Ro(n), n=1,2, . . . , N, of the current plane of section image are transformed slice by slice, a preset deviation value is set, and the preset deviation value is ε=6±2, when a distance between the aorta center positions of the current plane of section image and the preceding plane of section image is greater than a preset deviation value, the detection is stopped, and the current plane of section image is determined as the last slice of plane of section image, and the aorta center position Co(n) and the aortic radius Ro(n) in the last slice of plane of section image are acquired;

establishing a binarized sphere structure according to the aortic center position and the aortic radius by taking the aortic radius as the radius of the binarized sphere structure, and synthesizing a second ascending aorta structure by combining the first ascending aorta structure with the structure mask and the binarized sphere structure, wherein at the aortic center position Co(n), a binarized sphere structure Sph$_X$ is established by taking the aortic radius Ro(n) as the radius, and a seconding ascending aortic structure A$_S$ is synthesized by combining the first ascending aortic structure A$_n$ with the structural mask B and the binarized sphere structure Sph$_X$, and the calculation formula is:

$$A_S=(A_N \cup Sph_X) \cap B$$

where A$_S$ is the second ascending aortic structure, A$_N$ is the first ascending aortic structure, Sph$_X$ is the binarized sphere structure and B is the structural mask, and erosion is performed via a morphological opening operation, so as to obtain a supplementary area of an ascending aorta root, and the second ascending aortic structure A$_S$ is the complete ascending aortic structure of an aortic sinus;

wherein in order to enhance blood vessels of the heart, prevent the contrast of blood vessels in the heart region from being very low and prevent the blood vessel information from being suppressed, a contrast equalization filtering is performed on the image data according to the shape of the blood vessel and the strength of the blood vessel signal to enhance the coronary arteries; F$_A$ and F$_B$ are blood vessel shape measures, and F$_C$ is a blood vessel signal strength measure, which is used to improve the signal-to-noise ratio of blood vessels in the heart region, wherein:

$$F_A = e^{-\frac{(1-R_A)^2}{2\alpha^2}}, F_B = e^{-\frac{R_B^2}{2\beta^2}}, F_C = \begin{cases} \gamma_C \cdot e^{-\frac{(z_\sigma - R_C)^2}{2c^2}} & Z_\sigma \leq c \\ \gamma_C + (1-\gamma_C) \cdot \frac{Z_\sigma - R_C}{(1-r_h) \cdot c} & Z_\sigma > c \end{cases}$$

wherein, $R_A$ and $R_B$ are two measurement functions based on the characteristics values of Hessian Matrix, $R_A$ is used to distinguish between a sheet structure and a linear structure, $R_B$ is used to distinguish between a point structure and a linear structure, $\alpha$, $\beta$, and C function as thresholds for controlling the sensitivity of $R_A$, $R_B$, and $R_C$, and $\gamma_C \in (0,1)$ is a response expectation constant which generally ranges from 0.5 to 0.8;

under a certain scale $\sigma$, spatial Hessian matrix norm $\|H_\sigma\| = \sqrt{\Sigma_{j \leq D} \lambda_j^2}$ exhibits a higher response in the lung region with a larger blood vessel contrast, but exhibits a smaller response in the heart region; $\|H_\sigma\|$ mean value and maximum value in the lung region and the peripheral region both trend to monotonously increase;

when $Z_{\sigma 0}$ be a zero matrix, the maximum norm value under each scale is recorded as:

$$Z_\sigma n(x) \triangleq \max_x \{Z_\sigma n - 1(x), \|H_\sigma n(x)\|\}, n=1, \ldots, N$$

a dynamic threshold c is found to distinguish between the lung region and other tissues according to $Z_\sigma \leq c$ and $Z_\sigma > c$ in measurement $F_C$; the non-lung region is defined as $\theta_h$, the maximum norm is calculated in $\theta_h$ and the full space $\Theta$ respectively via $r_h = \|H_{\sigma_n}(x)\|_{max}/\|H_{\sigma_n}(\Theta)\|_{max}$, $r_h \in (0.65,1)$ is calculated by experimental statistics, and then the parameter $c = r_h \cdot \max(Z_\sigma)$ is obtained; let $R_C = c$, and a blood vessel characteristic graph $V(x, \sigma)$ after contrast enhancement is finally obtained, $$V(x, \sigma) \triangleq \begin{cases} 0 & \text{if } \lambda_2 > 0 \text{ or } \lambda_3 > 0 \\ F_A \cdot F_B \cdot F_C & \text{else} \end{cases},$$

where $\lambda_2$ and $\lambda_3$ are the second characteristic value and the third characteristic value of the spatial Hessian matrix respectively.

2. A device for extracting a cardiovascular vessel from a CTA image, comprising a memory, a processor, and a computer program stored in the memory and executable on the processor, wherein the steps of the method of claim 1 are implemented when the computer program is executed by the processor.

3. An apparatus for extracting a cardiovascular vessel from a CTA image, wherein the apparatus comprises:

a structure mask acquiring unit, configured for performing erosion operation and dilation operation on image data I successively via a preset structural element Kr to obtain a structure mask, the image data I is a coronary angiography image after down-sampling processing and the structural mask I' is a structure excluding lung region, wherein a sphere of which the radius is controlled at a preset volume element is selected, and the number of the above preset volume elements is 6±2, the sphere of which the radius is controlled at the preset volume element is used as a preset structural element Kr, the erosion operation is performed on the image data I firstly via the preset structural element Kr, and then the dilation operation is performed via the preset structural element Kr to obtain the structure mask I' with a calculation formula expressed as: $I' = I \circ K_r = (I \ominus K_r) \oplus K_r$;

a slice-by-slice transformation unit, configured for performing a slice-by-slice transformation on plane of section images of the structural mask I' to acquire the first ascending aortic structure in the structural mask, and acquiring an aortic center position and an aortic radius in the last slice of the plane of section image of the structural mask I', wherein, during the slice-by-slice transformation, the aortic center positions Co(n) and the aortic radius Ro(n), n=1,2, ..., N, of the current plane of section image are transformed slice by slice, a preset deviation value is set, and the preset deviation value is $\varepsilon = 6 \pm 2$, when a distance between the aorta center positions of the current plane of section image and the preceding plane of section image is greater than a preset deviation value, the detection is stopped, and the current plane of section image is determined as the last slice of plane of section image, and the aorta center position Co(n) and the aortic radius Ro(n) in the last slice of plane of section image are acquired; and a synthesizing unit, configured for establishing a binarized sphere structure according to the aortic center position and the aortic radius by taking the aortic radius as the radius of the binarized sphere structure, and synthesizing a second ascending aorta structure by combining the first ascending aorta structure with the structure mask and the binarized sphere structure, wherein at the aortic center position Co(n), a binarized sphere structure $Sph_X$ is established by taking the aortic radius Ro(n) as the radius, and a seconding ascending aortic structure $A_S$ is synthesized by combining the first ascending aortic structure $A_n$ with the structural mask B and the binarized sphere structure $Sph_X$, and the calculation formula is:

$$A_S = (A_N \cup Sph_X) \cap B$$

where $A_S$ is the second ascending aortic structure, $A_N$ is the first ascending aortic structure, $Sph_X$ is the binarized sphere structure and B is the structural mask, and erosion is performed via a morphological opening operation, so as to obtain a supplementary area of an ascending aorta root, and the second ascending aortic structure $A_S$ is the complete ascending aortic structure of an aortic sinus;

wherein in order to enhance blood vessels of the heart, prevent the contrast of blood vessels in the heart region from being very low and prevent the blood vessel information from being suppressed, a contrast equalization filtering is performed on the image data according to the shape of the blood vessel and the strength of the blood vessel signal to enhance the coronary arteries; $F_A$ and $F_B$ are blood vessel shape measures, and $F_C$ is a blood vessel signal strength measure, which is used to improve the signal-to-noise ratio of blood vessels in the heart region, wherein:

$$F_A = e^{-\frac{(1-R_A)^2}{2\alpha^2}}, F_B = e^{-\frac{R_B^2}{2\beta^2}}, F_C = \begin{cases} \gamma_C \cdot e^{-\frac{(z_\sigma - R_C)^2}{2c^2}} & Z_\sigma \leq c \\ \gamma_C + (1 - \gamma_C) \cdot \frac{Z_\sigma - R_C}{(1 - r_h) \cdot c} & Z_\sigma > c \end{cases},$$

wherein, $R_A$ and $R_B$ are two measurement functions based on the characteristics values of Hessian Matrix, $R_A$ is used to distinguish between a sheet structure and a linear structure, $R_B$ is used to distinguish between a point structure and a linear structure, $\alpha$, $\beta$, and C function as thresholds for controlling the sensitivity of $R_A$, $R_B$, and $R_C$, and $\gamma_C \in (0,1)$ is a response expectation constant which generally ranges from 0.5 to 0.8;

under a certain scale $\sigma$, spatial Hessian matrix norm $\|H_\sigma\| = \sqrt{\Sigma_{j \leq D} \lambda_j^2}$ exhibits a higher response in the lung region with a larger blood vessel contrast, but exhibits a smaller response in the heart region; $\|H_\sigma\|$ mean value and maximum value in the lung region and the peripheral region both trend to monotonously increase;

when $Z_{\sigma 0}$ be a zero matrix, the maximum norm value under each scale is recorded as:

$$Z_\sigma n(x) \triangleq \max_x \{Z_\sigma n-1(x), \|H_\sigma n(x)\|\}, n=1,\ldots,N$$

a dynamic threshold c is found to distinguish between the lung region and other tissues according to $Z_\sigma \leq c$ and $Z_\sigma > c$ in measurement $F_C$; the non-lung region is defined as $\theta_h$, the maximum norm is calculated in $\theta_h$ and the full space $\Theta$ respectively via $r_h = \|H_{\sigma_n}(x)\|_{max}/\|H_{\sigma_n}(\Theta)\|_{max}$, $r_h \in (0.65, 1)$ is calculated by experimental statistics, and then the parameter $c = r_h \cdot \max(Z_\sigma)$ is obtained; let $R_C = c$, and a blood vessel characteristic graph $V(x, \sigma)$ after contrast enhancement is finally obtained, $$\mathcal{V}(x, \sigma) \triangleq \begin{cases} 0 & \text{if } \lambda_2 > 0 \text{ or } \lambda_3 > 0 \\ F_A \cdot F_B \cdot F_C & \text{else} \end{cases},$$

where $\lambda_2$ and $\lambda_3$ are the second characteristic value and the third characteristic value of the spatial Hessian matrix respectively.

4. The apparatus of claim 3, wherein the apparatus further comprises:

a processor, and a computer-readable storage medium storing a computer program, the computer program can be executed by the processor to realize the functions of the structure mask acquiring unit, the slice-by-slice transformation unit, and the synthesizing unit.

\* \* \* \* \*